(12) United States Patent
Schmand et al.

(10) Patent No.: US 8,089,037 B2
(45) Date of Patent: Jan. 3, 2012

(54) REAL-TIME GAIN COMPENSATION FOR PHOTO DETECTORS BASED ON ENERGY PEAK DETECTION

(75) Inventors: Matthias J. Schmand, Lenoir City, TN (US); Dongming Hu, Knoxville, TN (US); Ziad Burbar, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 353 days.

(21) Appl. No.: 12/561,204

(22) Filed: Sep. 16, 2009

(65) Prior Publication Data

US 2010/0065723 A1   Mar. 18, 2010

Related U.S. Application Data

(60) Provisional application No. 61/097,338, filed on Sep. 16, 2008.

(51) Int. Cl.
*H01L 27/00* (2006.01)

(52) U.S. Cl. ..................................... 250/208.1; 250/238

(58) Field of Classification Search ............... 250/214.1, 250/214 R, 238, 208.1, 214 AG, 363.01–363.05; 327/59–83, 336–345, 514
See application file for complete search history.

(56) References Cited

U.S. PATENT DOCUMENTS 4,479,052 A * 10/1984 Suzuki ...................... 250/214 R

* cited by examiner

*Primary Examiner* — Que T Le
(74) *Attorney, Agent, or Firm* — Peter L. Kendall

(57) ABSTRACT

A method, process and apparatus for compensating for changes to the gain of photo detectors in a nuclear imaging apparatus is disclosed. Specifically, embodiments detect positron annihilation event pulses using photo detectors. Changes to the gain of the photo detectors are compensated for by determining the relationship of a detected event pulse peak with a target event pulse peak. Based on the difference between these two peaks, a corrected gain is determined in a closed-loop control system. The corrected gain can be used to compensate for temperature changes that can affect the gain of the photo detectors.

18 Claims, 4 Drawing Sheets

| Time (S) | Chiller Water Set Point °C | Detector Cassette Air Temperature °C |
|---|---|---|
| 0 | 17 | 28.82 |
| 600 | 15 | 28.82 |
| 1200 | 14 | 28.47 |
| 1800 | 14 | 28.14 |
| 2400 | 14 | 28.01 |

REAL-TIME GAIN COMPENSATION FOR PHOTO DETECTORS BASED ON ENERGY PEAK DETECTION

CROSS REFERENCE TO RELATED APPLICATIONS

The present application claims priority to U.S. Provisional Patent Application No. 61/097,338, filed on Sep. 16, 2008, which is hereby incorporated by reference in its entirety, for all purposes, herein.

BACKGROUND OF THE INVENTION

1. Technical Field

In general, the present disclosure relates to nuclear medical imaging. More particularly, the disclosure relates to Positron Emission Tomography (PET) and Single Photon Emission Computed Tomography (SPECT) compensating for changes to the gain of a photo detector due, inter alia, temperature variation.

2. General Background of the Invention

Nuclear medicine is a unique specialty wherein radiation emission is used to acquire images that show the function and physiology of organs, bones or tissues of the body. The technique of acquiring nuclear medicine images entails first introducing radiopharmaceuticals into the body—by either injection or ingestion. These radiopharmaceuticals are attracted to specific organs, bones, or tissues of interest. The radiopharmaceuticals produce gamma photon emissions, which emanate from the body and are then captured by a scintillation crystal. The interaction of the gamma photons with the scintillation crystal produces flashes of light or electromagnetic radiation in a different spectrum, which are referred to as "scintillation events." Scintillation events can be detected by an array of photo detectors (such as photomultiplier tubes (PMT) or avalanche photodiodes (APD)), and the event pulses are processed and stored. The stored data can be processed in the reconstruction system and a volume image illustrating the distribution of the radioisotopes in the body is reconstructed. The tracer distribution image can be overlayed with morphological images produced by other imaging modalities such as CT or MR. For example, CT and MR system can be integrated with other nuclear imaging systems to create a hybrid to yield more information to a health practitioner.

One particular nuclear medicine imaging technique is known as positron emission tomography, or PET. PET is used to produce images for diagnosing the biochemistry or physiology of a specific organ, tumor or other metabolically active site. The measurement of tissue concentration using a positron emitting radionuclide is based on coincidence detection of the two gamma photons arising from a positron annihilation or coincidence event. When a positron is annihilated by an electron, two 511 keV gamma photons are simultaneously produced and travel in approximately opposite directions. Gamma photons produced by a coincidence event can be detected by a pair of oppositely disposed radiation detectors capable of producing a signal in response to the interaction of the gamma photons with a scintillation crystal. Coincidence events are typically identified by a time coincidence between the detection of the two 511 keV gamma photons in the two oppositely disposed detectors; i.e., the gamma photon emissions are detected virtually simultaneously by each detector. When two oppositely disposed gamma photons each strike an oppositely disposed detector to produce a time coincidence event, they also identify a line-of-response (LOR) along which the coincidence event has occurred. An example of a PET method and apparatus is described in U.S. Pat. No. 6,858,847, which patent is incorporated herein by reference in its entirety.

The gamma photons detected by the scintillator can be converted into scintillation photons, which can be detected by the photo sensors (e.g. PMT or APD). The photo sensor can convert the light into a current, which generates electric pulses. The pulses are proportional to the energy of the impinging gamma photons detected by the scintillator and can be processed and stored by the system front-end electronics. The processed pulses, also called events, can be processed into an energy histogram, i.e. energy spectrum (FIG. 2). The dynamic range of the front-end electronic processing will determine the number of bins (typically 128 or 256) in the energy spectrum. Based on the photo-peak position 23, representing the gamma energy of the radioisotope of the tracer (e.g., 511 keV for PET annihilation gamma radiation), the spectrum of energy received by the photo sensors can be calibrated and the bin width calculated (e.g., bin width=256/511 keV≈2 keV). In order to discriminate scattered radiation from unscattered "true" events, a lower-level discriminator (LLD) 21 and upper-level discriminator (ULD) 22 are defined around the energy peak 23. Only events falling within the window of the LLD and ULD will be qualified and processed for reconstruction. The stability of the photo peak position within the energy spectrum is of utmost importance and will directly relate to image quality of the reconstructed tracer distribution.

SUMMARY OF THE INVENTION

APDs are commonly used to build a PET system for PET-MR imaging because it is insensitive to magnetic fields. However, the gain of APD is sensitive to temperature fluctuation even when the reverse-biasing voltage is constant. Investigations show that the gain of certain APDs can vary 11% per degree C. (FIG. 1). Although the temperature of the APD can be controlled by a detector cooling system, localized heating induced by the gradient of MR cannot be avoided and engineering solutions for temperature stabilization and gradient shielding might be impractical or cost prohibitive. Temperature changes may also occur in other applications such as a standalone APD PET system due to environmental temperature variations. Photo sensor gain fluctuation due to temperature are not only possible in APD-based systems but PMT based systems as well. In addition, PMT based systems are highly sensitive to magnetic field changes (e.g. earth magnetic field, tomographic orientation in earth magnetic field) and would benefit from the disclosure as well.

Coincident events are commonly stored in energy histograms. Each bin of the histogram can represent one range of energy. If the gain of a photo detector changes, the energy range represented by each bin can correspondingly change. Therefore, the bin representing 511 keV may change as a result of a change in temperature affecting the gain of the photo sensor.

Accurate determination of the energy peak of coincidence events can be helpful for determining whether an annihilation has occurred. If, as shown in FIG. 2, the peak shifts as a function of a change in temperature, the total integral (equivalent of the number of detected and qualified events) between lower-level discriminator (LLD) 21 and the upper-level discriminator (ULD) 22 may not be as great because the peak is not centered in between the two. Accordingly, some events may be incorrectly categorized as true coincidence or scatter events. Therefore, the system can compensate for the changes in gain because of temperature variation.

A temperature control system can hold the temperature of the photo detectors at a constant value, but this solution can result in additional cost, engineering noise, and space requirement. Therefore, a more robust, cost-effective, space saving, and low noise solution is needed and embodiments of the present disclosure seek to provide such a solution.

The present disclosure teaches a method, process, and apparatus for compensating for changes to the gain of photo detectors caused by changes in temperature. The compensation improves identification of scatter, random, true coincidence events. Improved identification can increase the accuracy of a finally rendered image.

Specifically, embodiments compensate for changes of photo detector gain in real time (or near real time) based on the feedback from the peak position measured from energy histogramming. The gain compensation can be implemented in multiple ways. For example, one way is to correct the energy of incoming events in real time (or near real time), which corrects the energy peak in the energy histogram back to the target position (energy peak correct). Another way is to adjust the LLD and the ULD to accommodate energy changes of the incoming events.

Specifically, one embodiment includes a method of compensating for temperature changes in at least one photo detector of a nuclear imaging apparatus. The method includes collecting, by the photo detector, electromagnetic radiation resulting from an event pulse. The method also includes determining, by processor, an actual peak of the event pulse. The method also includes generating, by a closed-loop control system, a control error between the target peak and an actual peak. The method also includes determining, by the closed-loop control system, a correction value based on the control error. The method further includes calculating, by the closed-loop control system, a corrected gain using the correction value and a corrected event pulse peak.

Another embodiment includes a computer program embodied as computer-executable instructions stored on a computer-readable medium for compensating for changes to photo detector gain. The computer program includes determining a target peak of the event pulse. The computer program also includes generating a control error between the target peak and an actual peak. The computer program also includes determining a correction value based on the control error. The computer program also includes calculating a corrected gain using the correction value and a corrected event pulse peak.

Still another embodiment includes a nuclear imaging apparatus. The apparatus includes at least one photo detector, having a gain configured for detecting an event pulse. The apparatus also includes a processor configured for determining a peak of data representative of the event pulse. The apparatus also includes a closed-loop control system configured for determining a corrected gain to correct the gain of the at least one photo detector, wherein the processor is further configured to adjust the data representative of the event pulse in accordance with the corrected gain.

DETAILED DESCRIPTION OF THE INVENTION

Figure 1:
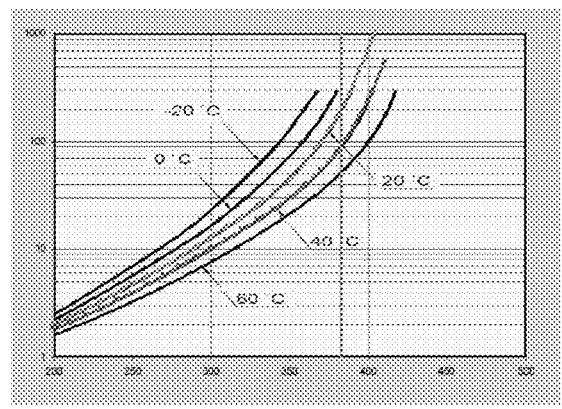
FIG. 1 illustrates voltage curves for the gain of an APD under different temperatures in accordance with an exemplary embodiment.
Figure 2:
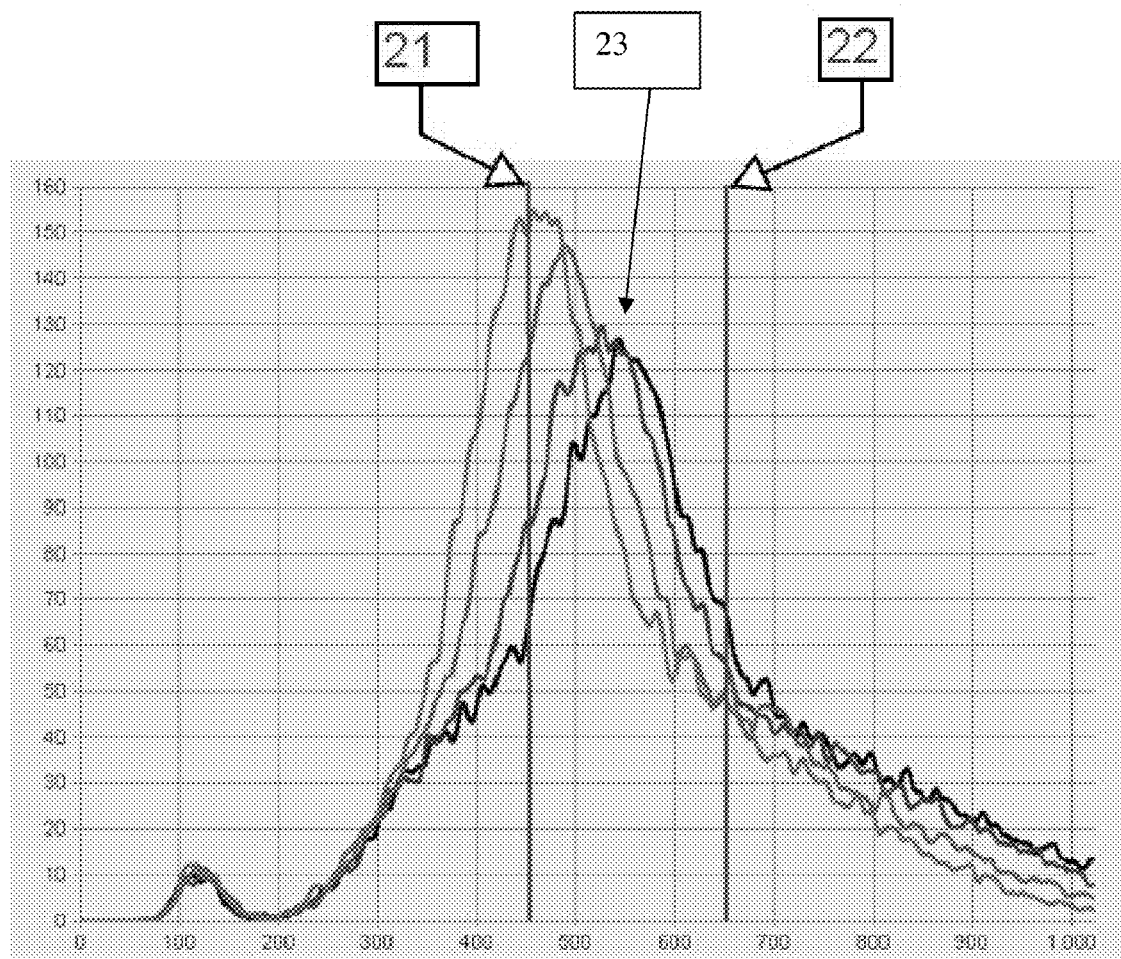
FIG. 2 illustrates energy peak shifts caused by APD gain variation under different temperatures in accordance with an exemplary embodiment.

Preferred embodiments will be described more fully hereinafter with reference to the accompanying drawings. Other embodiments are contemplated in many different forms and this disclosure should not be construed as limited to the embodiments set forth herein; rather, these embodiments are provided so that this disclosure will be thorough and complete, and will fully and clearly convey the scope of the disclosure to those skilled in the art. In the drawings, like numbers refer to like elements.

Figure 3:
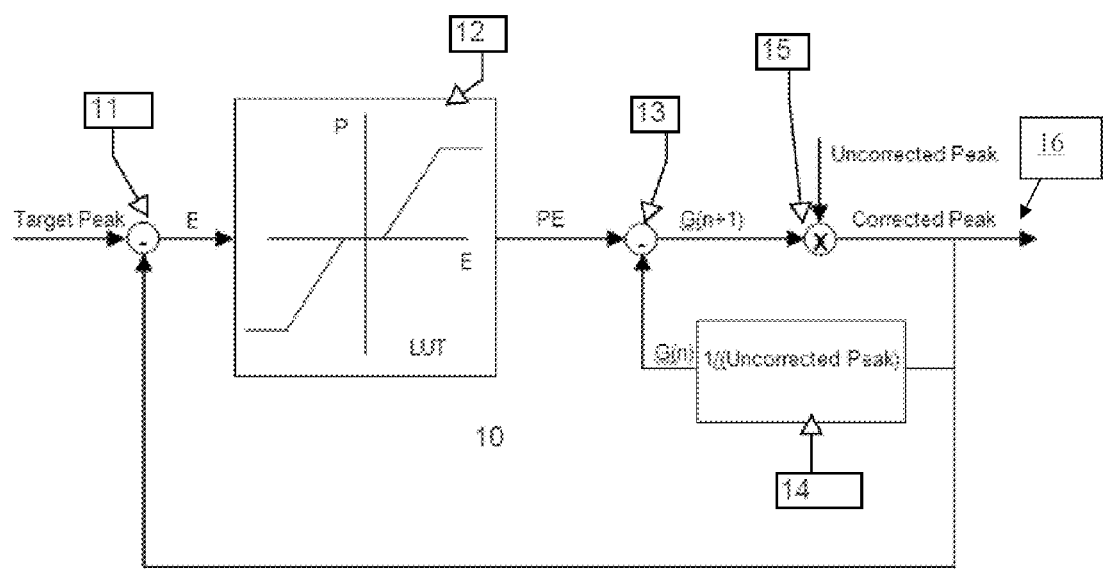
FIG. 3 illustrates a control system diagram for peak energy correction in accordance with an exemplary embodiment.

FIG. 3 illustrates an exemplary embodiment including closed-loop control system 10. In this embodiment, a target energy peak can first be determined to be a constant bin value, for example, bin 128, or may be determined during a calibration process in which 511 keV events can be acquired. The feedback of the control system can be the energy peak position bin measured from energy histogramming for a certain amount of events. The bin corresponding to the detected energy peak is then known to be the bin associated with the 511 keV energy window. Thereafter, if the bin associated with a subsequent peak is shifted from the target bin, it can be assumed that some event has changed the gain of the photo detector, e.g., the temperature has changed, thereby affecting the gain of the photo detector, and adjustment can be used to improve the data collected. This assumption is valid because the energy of 511 keV annihilation radiation is constant and not dependent on temperature.

After calibration, a scan may be initiated and the 511 keV peak position of the collected data can be calculated using one of many well-known peak detection algorithms. This uncorrected peak can be used as an input to closed loop system 10. In the initial condition of closed system 10, gain G can be assumed to be one, and no correction is needed. The current peak (or corrected peak) 16, which is the uncorrected peak times the gain G, can be used as a feedback to closed loop system 10. After the initial condition is processed, the difference between the corrected peak 16 and the target peak can determined at subtractor 11, which outputs control error (E). E can be used as a key in lookup table (LUT) 12, which outputs control gain PE. P can a function of E and can generally be described, for example, by the function illustrated in LUT 12. The control gain PE can then be subtracted, using subtractor 13, from the gain of the previous iteration 14 of closed-loop system 10 to determine the gain for the current iteration. By defining P, the energy peak can be controlled to the target bin quickly. The closed-loop control system can be run continuously during acquisition to ensure the energy peak is located around the target bin. The compensated gain may be used for further processing steps.

Figure 4:
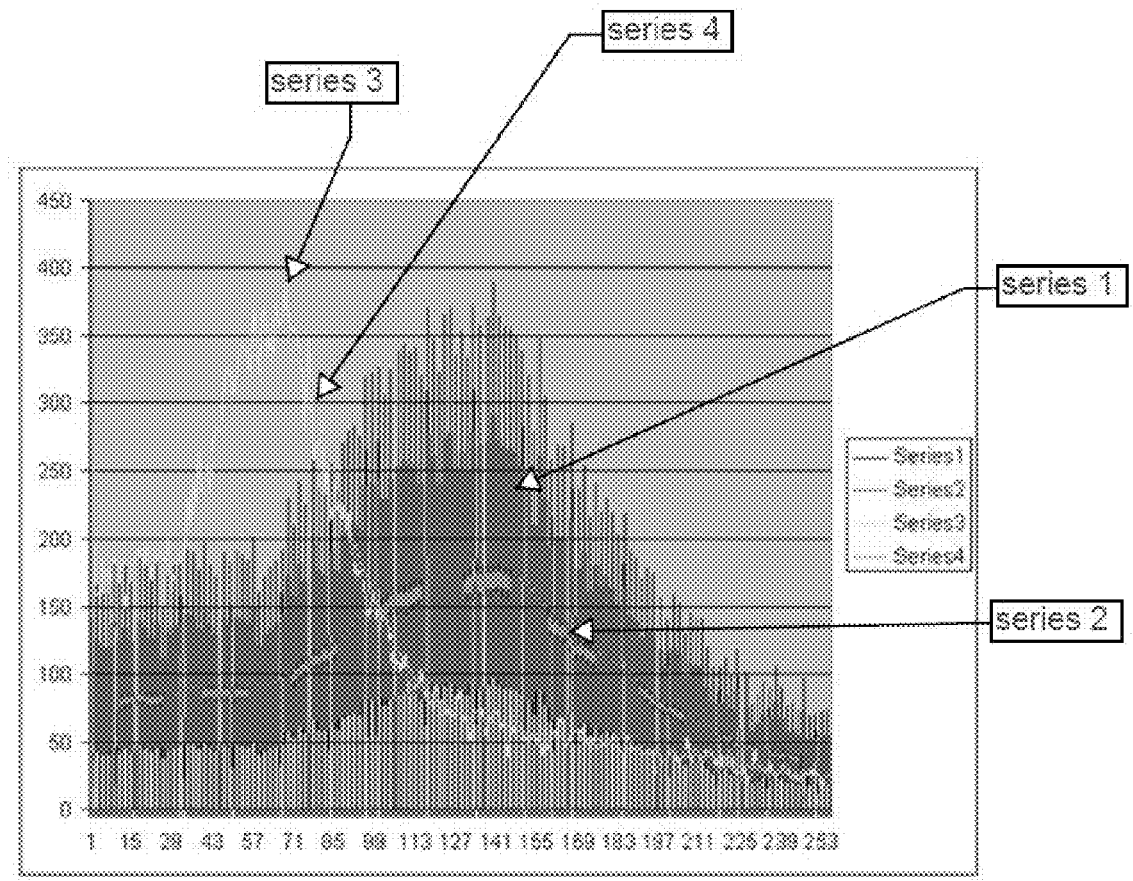
FIG. 4 illustrates zero gap effects in a corrected energy histogram when gain >1 in accordance with an exemplary embodiment.

As illustrated in FIG. 4, the additional processing steps can include applying the gain to all of the bins of the histogram. FIG. 4 illustrates raw data (series 3) of an energy histogram and a filtered version of the raw data (series 4). The gain G can be multiplied to each of the bins to compensate for the changed gain resulting from a change in temperature. In the example of FIG. 4, series 1 represents such a compensation. For example, in the case that the gain is two, there can be a 100% increase in the energy window of each bin. Accordingly, assuming bin 1 initially represents 0-1 keV, bin 2 represents 1-2 keV, etc. after multiplication with the gain, bin 1 now represents 0-2 keV and bin 2 represents 2-4 keV. This can result in digitization, or a zero-gap effect, which means that there can be empty bins, thereby making it more difficult to find the peak of the energy histogram. To avoid the zero-gap effect, the energy levels can be detected at a higher resolution to reduce the number of empty bins and improve the accuracy of the final curve of the histogram. The histogram may also be filtered using, for example, a 16-point (not limited to 16) average filter to smooth the curve and ease detection of the peak. This filtering is illustrated as series 2 of FIG. 4.

The additional processing steps may also include changing the LLD and the ULD. In other words, the LLD and ULD are adjusted according to the corrected gain to correspond to the new bin that contains the counts for the 511 keV window. In this embodiment, the energy spectrum would not be multiplied by the gain factor. As discussed above, the moving the LLD and ULD improves a final image that would otherwise be degraded due to a temperature change that affects the gain of the photo detectors.

The method and apparatus described above could be implemented using a field programmable gate array (FPGA) or an application specific integrated circuit (ASIC). This embodiment can be more expensive but will allow real time implementation and therefore likely the most preferred embodiment.

The method and apparatus described above could simplified by implementing a majority of the calculations in software rather than hardware. For example, the closed loop system can be implemented in a computer readable medium. As is known in the art, a computer readable medium can include, for example, a hard disk drive, flash memory, a CD-ROM, or other non-volatile memory. The computer readable medium can be used in conjunction with a nuclear imaging apparatus comprising a computer for executing instructions in accordance with the exemplary embodiments.

Specifically, a charge generated at an APD can be digitally sampled and processed in a manner similar to the process executed by the apparatus described in FIG. 3. In particular, a histogram generated using data collected from a plurality of ADPs can be processed and compensated based on deviation from a target peak using computer instructions, executed on a processor, to perform the operations of the closed-loop system. Therefore, costs can be reduced because less hardware would be used to execute the disclosed method and process because they can be implemented in the computer readable medium. Moreover, the process and method can be updated and customized for particular applications and will not be hard-wired into the system.

Figures 5, 6:
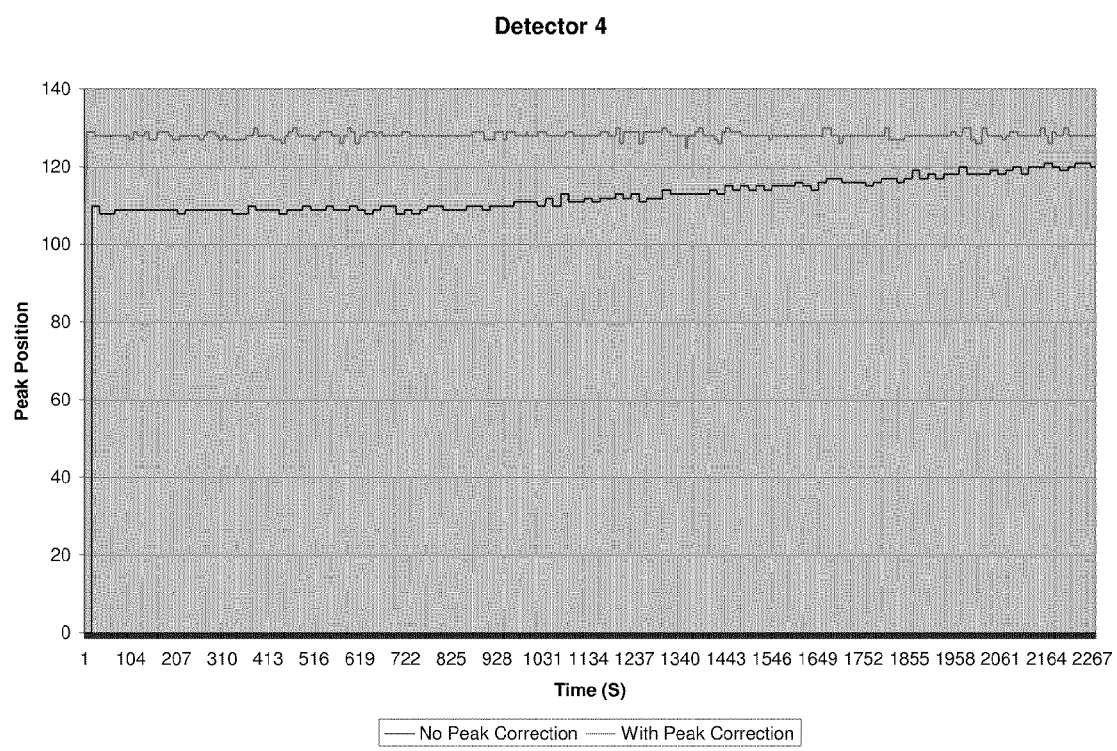
FIG. 5 illustrates experiment settings for performance assessment of energy peak correction in accordance with an exemplary embodiment.
FIG. 6 illustrates a performance assessment of energy peak correction by comparing peak position with and without peak correction in accordance with an exemplary embodiment.

Some benefits of embodiments are illustrated in experimental data provided in FIGS. 5 and 6. FIG. 5 illustrates changes in temperature of a temperature control system (water chiller), and a corresponding change in temperature of a detector cassette over a period of 2400 seconds. In the experimental results illustrated in FIG. 6, it can be seen that without energy peak correction, when detector cassette air temperature changes 0.7° C., the maximum shifting of the 511 keV energy peak can be around 20 bins. With energy peak correction, the position of 511 keV energy peak can be controlled successfully at the target bin with an error of +/−2 bins, which indicates a +/−1% control accuracy. Further improvements in control performance can be achieved by fine-tuning.

Different algorithms for peak detection can be used, the sample size of an event pulse can be increased, the resolution of event pulse energy can be increased, a different filter can be used, histogramming can be done in real time, and the speed of the system can be increased.

Those of ordinary skill can vary the nuclear imaging apparatus and methods for processing the coincidence events without varying from the scope of the invention as defined in the appended claims.

We claim:

1. A method of compensating for temperature changes in at least one photo detector of a nuclear imaging apparatus comprising:
   collecting, by the at least one the photo detector, electromagnetic radiation resulting from an event pulse;
   determining, by processor, an actual peak of the event pulse;
   generating, by a closed-loop control system, a control error between the target peak and the actual peak of the event pulse;
   determining, by the closed-loop control system, a correction value based on the control error;
   calculating, by the closed-loop control system, a corrected gain using the correction value and a corrected event pulse peak.

2. The method of claim 1, wherein the nuclear imaging apparatus comprises one or more of a group comprising a PET scanner and a SPECT scanner.

3. The method of claim 2, wherein the nuclear imaging apparatus further comprises a magnetic resonance imaging apparatus.

4. The method of claim 2, further comprising adjusting histogram bin counts according to the corrected gain.

5. The method of claim 2, further comprising adjusting an upper-level discriminator and a lower-level discriminator according to the adjusted gain.

6. The method of claim 2, wherein the electromagnetic radiation is collected using one of a group consisting of avalanche photodiodes and photomultiplier tubes.

7. A computer program embodied as computer-executable instructions stored on a non-transitory computer-readable medium for compensating for changes to photo detector gain, the program comprising instructions for:
   determining a target peak of the event pulse;
   generating a control error between the target peak and an actual peak;
   determining a correction value based on the control error;
   calculating a corrected gain using the correction value and a corrected event pulse peak.

8. The computer program of claim 7, wherein the nuclear imaging apparatus comprises one or more from a group comprising a PET scanner and a SPECT scanner.

9. The computer program of claim 8, wherein the nuclear imaging apparatus further comprises a magnetic resonance imaging apparatus.

10. The computer program of claim 8, further comprising adjusting histogram bin counts according to the corrected gain.

11. The computer program of claim 8, further comprising adjusting an upper-level discriminator and a lower-level discriminator according to the corrected gain.

12. The computer program of claim 8, wherein the electromagnetic radiation is collected using one of a group consisting of avalanche photodiodes and photomultiplier tubes.

13. A nuclear imaging apparatus comprising:
   at least one photo detector configured for detecting an event pulse;

the at least one photo detector having a gain;

a processor configured for determining a peak of data representative of the event pulse;

a closed-loop control system configured for determining a corrected gain to correct the gain of the at least one photo detector, wherein the processor is further configured to adjust the data representative of the event pulse in accordance with the corrected gain.

14. The nuclear imaging apparatus of claim 13, wherein the nuclear imaging apparatus comprises one or more from a group comprising a PET seamier and a SPECT scanner.

15. The nuclear imaging apparatus of claim 14, wherein the nuclear imaging apparatus further comprises a magnetic resonance imaging apparatus.

16. The nuclear imaging apparatus of claim 14, wherein the data comprises histogram bin counts.

17. The nuclear imaging apparatus of claim 14, wherein the data comprises an upper-level discriminator and a lower-level discriminator.

18. The nuclear imaging apparatus of claim 14, the at least one photo detector comprise one of a group consisting of avalanche photodiodes and photomultiplier tubes.

* * * * *